United States Patent
Cherry et al.

(10) Patent No.: US 11,523,004 B2
(45) Date of Patent: Dec. 6, 2022

(54) PART REPLACEMENT PREDICTIONS USING CONVOLUTIONAL NEURAL NETWORKS

(71) Applicants: Hewlett-Packard Development Company, L.P., Spring, TX (US); Rochester Institute of Technology, Rochester, NY (US)

(72) Inventors: Darrel D. Cherry, Boise, ID (US); Renee J. Jessome, Boise, ID (US); Richard E. Maggard, Boise, ID (US); Daniel Siddall, Boise, ID (US); Yeshwanth Raja, Rochester, NY (US); Eli Saber, Rochester, NY (US)

(73) Assignees: Hewlett-Packard Development Company, L.P., Spring, TX (US); Rochester Institute of Technology, Rochester, NY (US)

( * ) Notice: Subject to any disclaimer, the term of this patent is extended or adjusted under 35 U.S.C. 154(b) by 0 days.

(21) Appl. No.: 17/256,380

(22) PCT Filed: Sep. 21, 2018

(86) PCT No.: PCT/US2018/052257
§ 371 (c)(1),
(2) Date: Dec. 28, 2020

(87) PCT Pub. No.: WO2020/060565
PCT Pub. Date: Mar. 26, 2020

(65) Prior Publication Data
US 2021/0365311 A1  Nov. 25, 2021

(51) Int. Cl.
*H04N 1/00* (2006.01)

(52) U.S. Cl.
CPC ..... *H04N 1/00015* (2013.01); *H04N 1/00029* (2013.01); *H04N 1/00037* (2013.01); *H04N 1/00039* (2013.01); *H04N 1/00047* (2013.01); *H04N 1/00063* (2013.01)

(58) Field of Classification Search
None
See application file for complete search history.

(56) References Cited

U.S. PATENT DOCUMENTS

| | | | |
|---|---|---|---|
| 5,109,275 A * | 4/1992 | Naka | G03B 27/735 358/518 |
| 6,665,425 B1 | 12/2003 | Sampath et al. | |
| 6,862,414 B2 | 3/2005 | Sampath et al. | |
| 7,031,950 B2 * | 4/2006 | Darken | G06Q 10/06 706/15 |

(Continued)

*Primary Examiner* — Scott A Rogers
(74) *Attorney, Agent, or Firm* — HP Inc. Patent Department (57) ABSTRACT

An example of an apparatus including a communication interface to receive an image file is provided. The image file represents a scanned image of a output generated by a printing device. The apparatus further includes an identification engine to process the image file with a convolutional neural network model to identify a feature. The feature may be indicative of a potential failure. The apparatus also includes an image analysis engine to indicate a life expectancy of a part associated with the potential failure based on the feature. The image analysis engine uses the convolutional neural network model to determine life expectancy.

15 Claims, 5 Drawing Sheets

(56) References Cited

U.S. PATENT DOCUMENTS

| | | |
|---|---|---|
| 7,085,503 B2 | 8/2006 | Mokuya |
| 7,243,045 B2 | 7/2007 | Uwatoko et al. |
| 7,382,507 B2 | 6/2008 | Wu |
| 8,654,369 B2 | 2/2014 | Kogan et al. |
| 8,896,439 B2 | 11/2014 | Mercer et al. |
| 9,300,823 B1 | 3/2016 | Adachi |
| 10,831,417 B1* | 11/2020 | Su .................. G06N 20/00 |
| 11,100,630 B2* | 8/2021 | Wendel ............ G06T 7/001 |
| 2001/0012031 A1 | 8/2001 | Miyake et al. |
| 2002/0171697 A1 | 11/2002 | Gargir et al. |
| 2003/0142985 A1 | 7/2003 | Sampath et al. |
| 2005/0240376 A1 | 10/2005 | Uwatoko et al. |
| 2006/0110009 A1 | 5/2006 | Klassen et al. |
| 2008/0059120 A1 | 3/2008 | Xiao et al. |
| 2010/0274983 A1 | 10/2010 | Murphy et al. |
| 2018/0131815 A1* | 5/2018 | Spivakovsky ....... G06V 10/751 |
| 2020/0013158 A1* | 1/2020 | Asai ................ G06T 7/0002 |
| 2020/0175352 A1* | 6/2020 | Cha .................... G06N 3/08 |
| 2020/0302235 A1* | 9/2020 | Turcot ............ G06K 9/6257 |
| 2020/0393998 A1* | 12/2020 | Su .................. G06F 3/1208 |
| 2020/0410655 A1* | 12/2020 | Imamura .......... G06F 3/1259 |
| 2021/0334587 A1* | 10/2021 | Wang ............... G06T 7/001 |
| 2022/0060591 A1* | 2/2022 | Lin .................. G06F 3/121 |

\* cited by examiner

PART REPLACEMENT PREDICTIONS USING CONVOLUTIONAL NEURAL NETWORKS

BACKGROUND

Various devices and apparatus have parts or components with an undetermined life expectancy. The parts or components may fail periodically leading to the parts or components to be replaced. Component failure may not be a complete failure and instead lead to a decrease in the performance of the device or apparatus. Accordingly, the decrease in performance is to be diagnosed in order to identify a specific part or component that is to be serviced or replaced.

BRIEF DESCRIPTION OF THE DRAWINGS

Reference will now be made, by way of example only, to the accompanying drawings in which.

DETAILED DESCRIPTION

Output from printing devices may be widely accepted and may often be more convenient to use. In particular, output from printing devices are easy to distribute, store, and be used as a medium for disseminating information. In addition, output from printing devices may serve as contingency for electronically stored data which is to be presented by an electronic device, such as may happen when the electronic device fails, such as with a poor data connection for downloading the data file and/or a depleted power source.

With repeated use of a printing device to generate output, the printing devices use various parts or components that may wear down over time and eventually fail. Failure of a part in a printing device may result in significant down time to diagnose the problem to identify the part. In addition, if the failed part is not known, repair and replacement of the part is not possible. To reduce the amount of downtime of a printing device, some parts have estimated life expectancies measured in time, usage, or a combination of both. Accordingly, parts may be preemptively replaced to reduce the likelihood of downtime affecting the printing device. In order to prevent downtime, the estimated life expectancies of parts may be reduced to decrease the probability of a premature failure. Even with the reduced estimated life expectancies, parts may fail before its estimated life expectancy. This may cause the printing device to go out of service during the diagnosis and repair or replacement the failed part.

In some instances, the quality of the output from printing devices may provide some indication as to the health and/or life expectancy of some parts. Since there are a large number of parts in a printing, failure of a single part may result in a small change to the quality of the output from the printing device. In some instances, the change to the quality of the output from the printing device may not be noticeable to human operator. In other instances, the change to the quality of the output from the printing device may result in a noticeably imperfect output, which may in turn prompt an operator to file a complaint regarding the printing device quality. Such complaints are difficult to diagnose since one of many parts may be the cause. However, using machine learning methods to review the quality of the output from the printing device may provide a quick diagnosis that may reduce downtime for a printing device.

Figure 1:
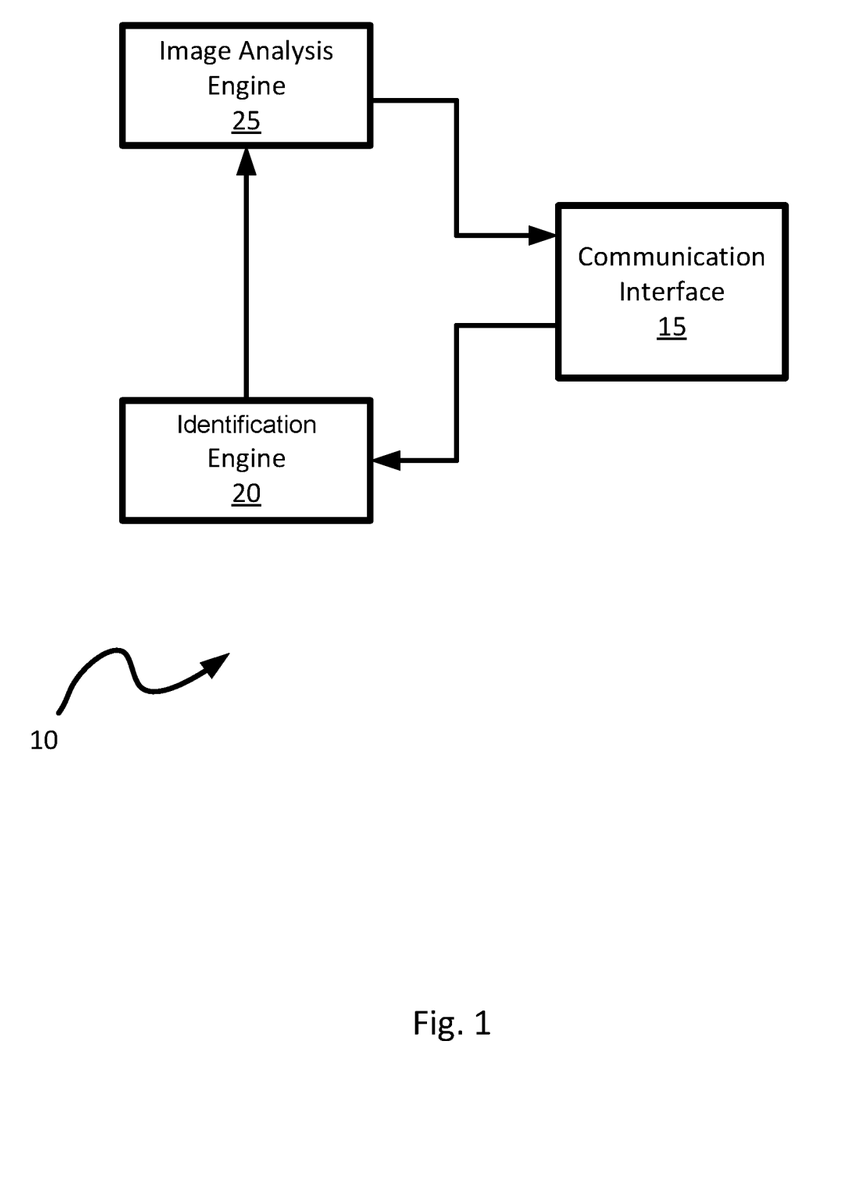
FIG. 1 is a block diagram of an example apparatus to monitor parts of a printing device.

Referring to FIG. 1, an example apparatus to monitor parts of a printing device is generally shown at 10. The apparatus 10 may include additional components, such as various memory storage units, interfaces to communicate with other computer apparatus or devices, and further input and output devices to interact with the user. In addition, input and output peripherals may be used to train or configure the apparatus 10 as described in greater detail below. In the present example, the apparatus 10 includes a communication interface 15, an image analysis engine 20, and an identification engine 25. Although the present example shows the image analysis engine 20 and the identification engine 25 as separate components, in other examples, the image analysis engine 20 and the identification engine 25 may be part of the same physical component such as a microprocessor configured to carry out multiple functions.

The communications interface 15 is to receive an image file. In the present example, the source of the image file is not particularly limited. For example, the image file may be generated at a printing device with the generation of output. In other examples, the image file may be generated using a scanning device. The image file may represent a scanned image of output generated by the printing device. For example, the output may be a document, a photograph, or a three-dimensional object. In the present example, the communications interface 15 may receive signals from a plurality of printing devices, such as if the apparatus 10 were to be operated as a service provided over a cloud network. Accordingly, the communications interface 15 may be to receive other data associated with the printing device, such as an identifier of the specific printing device, or data describing specifics of each printing device, such as a model number so that specifications of the printing device may be retrieved from a database.

The manner by which the communications interface 15 receives the image file from a printing device is not limited and may include receiving an electrical signal via a wired connection. For example, the communications interface 15 may be connected to the printing device in examples were the apparatus 10 is part of the printing device, such as part of an onboard diagnosis system. In other examples, the communications interface 15 may receive wireless signals such as via a Bluetooth connection, radio signals or infrared signals from the scanning device. In further examples, the communications interface 15 may be a network interface for communicating over a local area network or the Internet where the communications interface 15 may receive data from a remote printing device.

The identification engine 20 is to process the image file received by at the communications interface 15. In particular, the identification engine is to apply a convolutional neural network model to identify a feature in the image file. The specific feature to be identified from the image file is not particularly limited. In the present example, the feature may include a defect that is indicative of a potential failure or underperforming part.

The manner by which the convolutional neural network model is applied is not limited. It is to be appreciated that a convolutional neural network model uses multiple layers to identify features in an image. This model may be used on images with no preprocessing such that a raw image received by the communications interface 15 may be directly processed by the identification engine 20. For example, the convolutional neural network model may be a four layer convolutional neural network model trained with a training dataset having 64,000 training images and dividing each image file into a 128×128 grid. In other examples, the convolutional neural network may be a pre-built image recognition model that has been retrained with new fully connected layers and an output layer.

In the present example, the identification engine 20 is to use the convolutional neural network model trained using various training data designed to identify a feature of an image file on which further analysis is to be carried out. The feature may be a specific portion of the image file, or it may be a characteristic applied over the entire image file which is unlikely to be part of the intended image.

In the present example, the feature indicative of a potential failure may be a type of defect or a combination of defects observed in a portion of the image file. For example, the convolutional neural network model may be able to identify a banding issue where uniform portions of the image appear to have bands of slightly different shades. Another feature in the image file that may be identified may be an issue with the color plane registration causing portions of the image to appear out of focus, such that sharp edges may appear fuzzy. Furthermore, another feature or defect that may be identified by the identification engine 20 may be a fade where the image loses contrast or color intensity in certain portions. Other features or defects in an image file may include ghosting, streaking, shotgun, spots, or other visible image defects.

In other examples, the image file may represent a three-dimensional object obtained using a three-dimensional scanner of a printed object.

The image analysis engine 25 is to identify a part of a printing device associated with the feature identified by the identification engine 20. For example, the image analysis engine 25 may associate a part of a printing device and indicate a life expectancy based on the feature, or a combination of features, and the prominence of each feature identified by the identification engine 20. In the present example, the image analysis engine 25 uses a convolutional neural network model to determine the life expectancy of the part.

The manner by which the convolutional neural network model is applied is not limited. In the present example, the same convolutional neural network model that was applied to by the identification engine 20 is used by the image analysis engine 25. In other examples, separate convolutional neural network model trained with a separate training dataset may be applied.

Although the present examples use a convolutional neural network model to analyze the images, other artificial intelligence or machine learning models may be used. For example, other model may include support vector machines, random forest trees, Naïve Bayes classifiers, recurring neural networks, and other types of neural networks.

Figure 2:
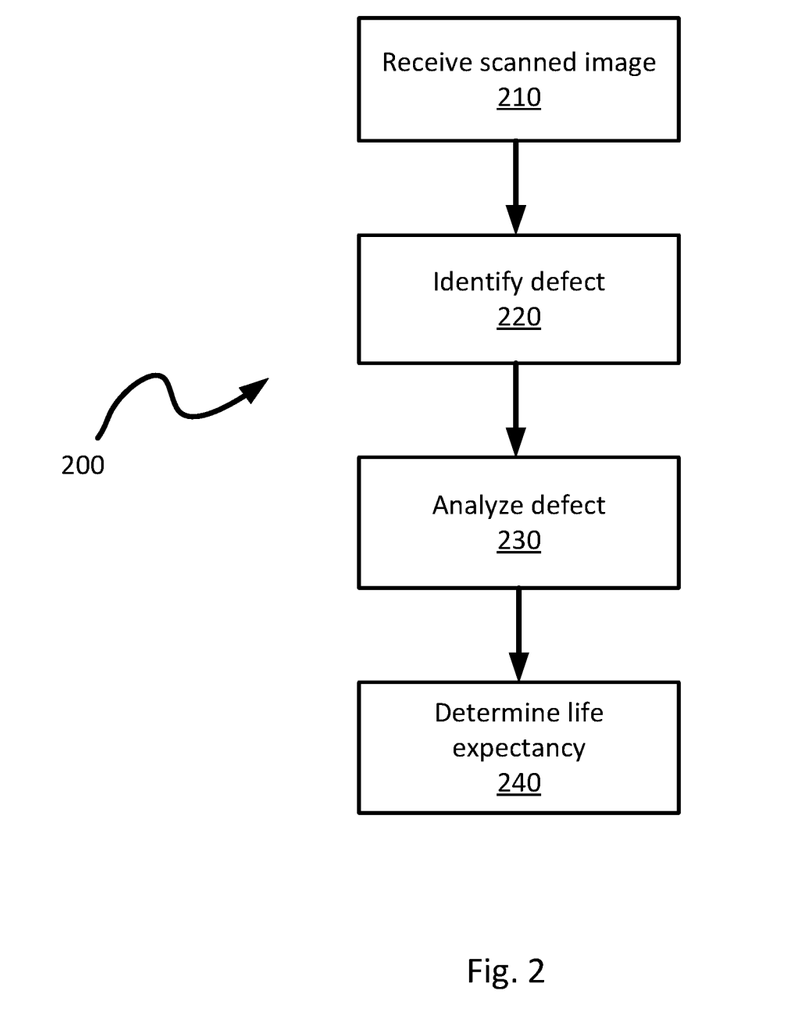
FIG. 2 is a flowchart of an example of a method of monitoring parts of a printing device.

Referring to FIG. 2, a flowchart of an example method of monitoring parts of a printing device is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the apparatus 10 and its various parts. In addition, it is to be emphasized, that method 200 may not be performed in the exact sequence as shown, and various blocks may be performed in parallel rather than in sequence, or in a different sequence altogether.

Beginning at block 210, a scanned image of a document or other output from a printing device is received at the apparatus 10. In the present example, the scanned image may be received by a communications interface 15. The manner by which the scanned image is received is not limited and may involve receiving an image file from a printing device via a wired connection or a wireless connection such as via a Bluetooth connection, radio signals or infrared signals. For example, the image file may be in a standard format such as JPEG, TIFF, GIF, PNG, BMP, or other formats. In other examples, the image file may be in a non-standard proprietary format associated with the printing device. In some examples, the scanned image may be received directly from an onboard diagnosis system of a printing device. In other examples, the scanned image may be received via a network interface for communicating over a local area network or the Internet where the image files may be received from a remote printing device.

Block 220 uses the identification engine 20 to identify a defect in the scanned image. In the present example, the identification engine 20 applies a convolutional neural network model to process the scanned image received at block 210. The defect to be identified from the scanned image is not particularly limited. In the present example, the defect may be an indication of a potential failure or underperforming part.

In the present example, the convolutional neural network model uses multiple layers to identify features in an image. The convolutional neural network model may be used on images with little or no preprocessing such that a raw image received in block 210 may be directly processed. In the present example, the convolutional neural network model may be a four layer convolutional neural network model trained with a training dataset having 64,000 training images and dividing each image file into a 128×128 grid. For example, an existing image recognition model, such as VGG16, may be used. In one example, the recognition model may be re-trained using a prior fully connected layer and output layer to successfully leverage the feature extraction from existing models. In some examples, VGG16 may use input image sizes of about 224×224. In other examples, the training set may be expanded beyond 64,000 images to about 100,000 to about 1,000,000 images.

In some examples, a rendered image from a data file may be used to train the convolutional neural network model as applied by the identification engine. In such an example, the rendered image may be generated from a source file sent to a printing device. Accordingly, the rendered image may be considered to be a passing sample with no defects. It is to be appreciated that the rendered image and the scanned image may subsequently be added to a database of images as part of a training dataset. Therefore, with each scanned image and rendered image, the apparatus 10 builds a larger training dataset to further increase the accuracy of identifying defects. The defects that may be identified by the identification engine 20 carrying out block 220 is not limited and may include defects such as banding, color plane registration issues, fading, ghosting, streaking, shotgun, and spots.

Block 230 involves determining a part associated with the defect identified in block 220. The manner by which the part associated with the defect is identified is not particularly limited. For example, the part may be identified using the same convolutional neural network model used in block 220. In other examples, a different convolutional neural network model or other machine learning model may be used. In further examples, other methods may be used to associate the part with the defect, such as lookup tables. In further examples, telemetry data may also be used by the identification engine to assist in the identification of a part causing a defect or a plurality of defects.

Block 240 determines the life expectancy of the part identified in block 230. In the present example, the image analysis engine 25 applies a convolutional neural network model to process the scanned image received at block 210 in view of the classifications made at block 220 and block 230. The life expectancy of the part is then to be determined.

In the present example, once the part has been identified and the life expectancy determined, it is to be appreciated that the information may be provided to a service provider of the printing device. For example, for smart printing devices, a message may be sent to a service provider indicating that a specific part may be expected to fail within a certain period of time. This may allow the service provider to proactively offer services or part replacements to the operator of the printing device. In other examples, the printing device may display the results of block 240 on a display of the printing device for an operator to view.

It is to be appreciated that variations are contemplated. For example, blocks 220, 230, and 240 may be carried out at the same time in a one step processes to determine a part life expectancy directly from processing the image. In other words, the convolutional neural network may operate directly on the image without identifying any defects in the image.

Figure 3:
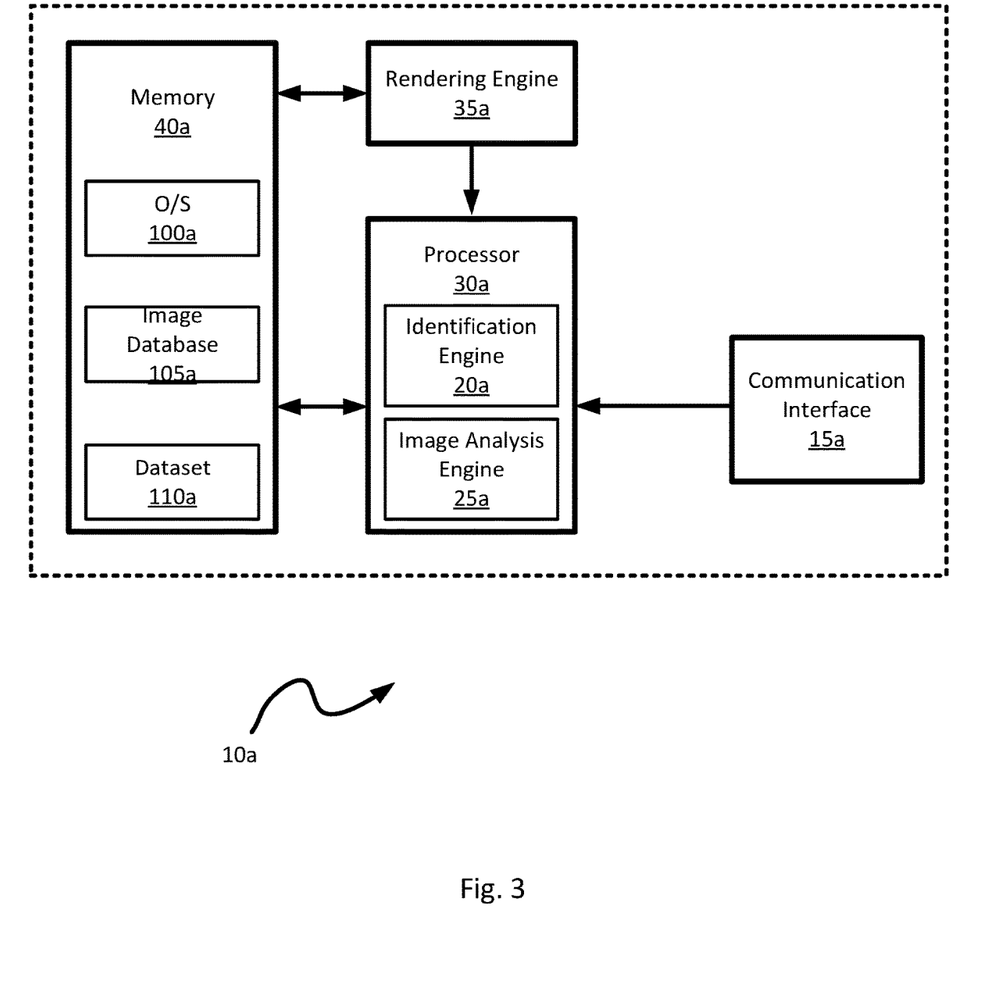
FIG. 3 is a block diagram of another example apparatus to monitor parts of a printing device.

Referring to FIG. 3, another example of an apparatus to monitor parts of a printing device is shown at 10*a*. Like components of the apparatus 10*a* bear like reference to their counterparts in the apparatus 10, except followed by the suffix "a". The apparatus 10*a* includes a communication interface 15*a*, a processor 30*a* to execute an image analysis engine 20*a* and an identification engine 25*a*, a rendering engine 35*a*, and a memory storage unit 40*a*.

The communications interface 15*a* is to receive an image file. In the present example, the source of the image file is not particularly limited. For example, the image file may be generated at a printing device with the generation of output. In other examples, the image file may be generated using a scanning device. The image file may represent a scanned image of output generated by the printing device, such as, the output may be a document, a photograph, or a three-dimensional object. In addition, the communications interface 15*a* may also receive a source file for the rendering engine 35*b*. In the present example, the source file may be received from the printing device or it may be received from a print server that is to send the source file to the printing device to generate output.

The processor 30*a* may include a central processing unit (CPU), a graphics processing unit (GPU), a microcontroller, a microprocessor, a processing core, a field-programmable gate array (FPGA), an application-specific integrated circuit (ASIC), or similar. The processor 30*a* and the memory storage unit 40*a* may cooperate to execute various instructions. The processor 30*a* may execute instructions stored on the memory storage unit 40*a* to carry out processes such as the method 200. In other examples, the processor 30*a* may execute instructions stored on the memory storage unit 40*a* to implement the identification engine 20*a* and/or the image analysis engine 25*a*. In other examples, the identification engine 20*a* and/or the image analysis engine 25*a* may each be executed on a separate processor. In further examples, the identification engine 20*a* and/or the image analysis engine 25*a* may be operated on a separate machine, such as from a software as a service provider.

The identification engine 20*a* and the image analysis engine 25*a* are not particularly limited and function similar to the identification engine 20 and the image analysis engine 25 as described above, respectively. In particular, the identification engine 20*a* is to process the image file received by at the communications interface 15*a* by applying a convolutional neural network model to identify a feature in an image file. In the present example, the identification engine may identify the feature based on differences between a rendered image generated by the rendering engine 35*a* as discussed in greater detail below, and the image file received by the communications interface 15*a*.

The image analysis engine 25*a* is to identify a part of a printing device associated with the feature identified by the identification engine 20*a*. In addition, the image analysis engine 25*a* may indicate a life expectancy of the part based on the feature and the prominence of the feature identified by the identification engine 20*a* using the convolutional neural network model.

The rendering engine 35*a* is to generate a rendered image file from a source file. In the present example, the source file may be received by a print server for distribution to a printing device. The source file represent data which the printing device may use to generate output. For example, the output generated may be a printed document based on a source file generated by an image editing program on a personal computer. Continuing with this example, the rendering engine 35*a* may use the source file to render an image file to represent the intended image to be generated by the printing device and may be considered to be a passing sample with no defects. The passing sample may then be used to train the convolutional neural network model used by the identification engine 20*a* to identify features or defects. The manner by which an image file is generated from a source file is not particularly limited. For example, the rendered image file may be visual representation of a data file which may involve rasterization or casting of the source file.

The memory storage unit 40*a* is coupled to the processor 30*a* and the rendering engine 35*a* and may include a non-transitory machine-readable storage medium that may be any electronic, magnetic, optical, or other physical storage device. In the present example, the memory storage unit 40*a* may store an operating system 100*a* that is executable by the processor 30*a* to provide general functionality to the apparatus 10*a*, for example, functionality to support various applications. Examples of operating systems include Windows™, macOS™, iOS™, Android™, Linux™, and Unix™. The memory storage unit 40*a* may additionally store instructions to operate the identification engine 20*a* and the image analysis engine 25*a* at the driver level as well as other hardware drivers to communicate with other components and other peripheral devices of the apparatus 10*a*, such as the communications interface 15*a* or various output and input devices (not shown).

In the present example, the memory storage unit 40*a* may also maintain an image database 105*a* to store image files received via the communication interface 15*a*. In the present example, the memory storage unit 40*a* may receive a plurality of image files to store in the image database 105*a* where the image files may be subsequently processed. For example, the apparatus 10a may receive multiple image files to process and the image files may be stored in a queue in the image database 105a for processing. In addition, once the image files have processed, the memory storage unit 40a may retain the image files in the image database 105a for subsequent use for training purpose of the convolutional neural network model.

The memory storage unit 40a may also maintain a training dataset 110a to training data for training the convolutional neural network model. The training dataset 110a is not particularly limited and may be loaded onto the memory storage unit 40a from an external source or library. In other examples, the training dataset 110a may be developed and augmented with each operation of the apparatus 10a to analyze a scanned image. Furthermore, although a single training dataset 110a is illustrated, it is to be appreciated that multiple training datasets may be used to train multiple convolutional neural network models, such as in the case of the identification engine 20a and the image analysis engine 25a using different convolutional neural network models.

Figure 4:
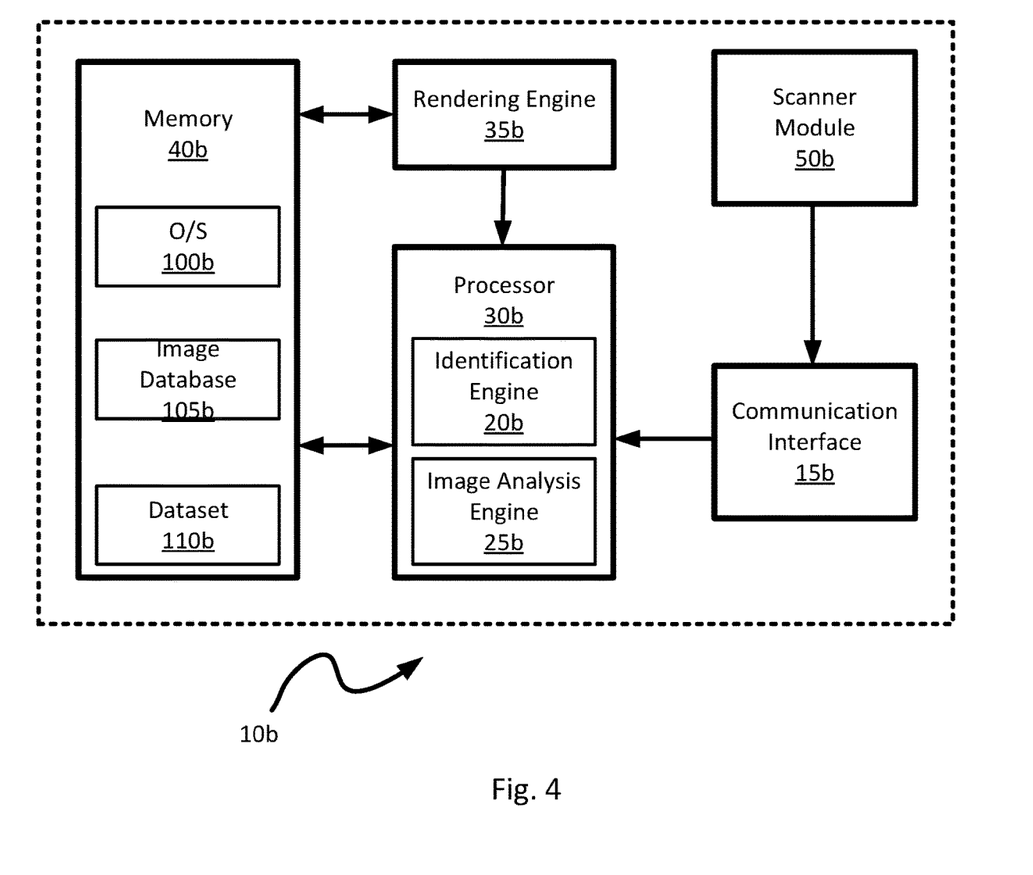
FIG. 4 is a block diagram of another example apparatus to monitor parts of a printing device with a scanning module.

Referring to FIG. 4, another example of an apparatus to monitor parts of a printing device is shown at 10b. Like components of the apparatus 10b bear like reference to their counterparts in the apparatus 10a, except followed by the suffix "b". The apparatus 10b includes a communication interface 15b, a processor 30b to execute an image analysis engine 20b and an identification engine 25b, a rendering engine 35b, and a memory storage unit 40b. In the present example, the memory storage unit 40b also includes an operating system 100b that is executable by the processor 30b, an image database 105b, and a training dataset 110b.

The apparatus 10b further includes a scanner module 50b. In the scanner module is to generate an image file based on an output of a printing device. In the present example, the scanner module 50b may be in communication with the communication interface. The scanner module 50b is not particularly limited and may include any device to generate a scanned image based on an object, such as output from a printing device. In the present example, the apparatus 10b may be a standalone device for scanning a variety of different output from multiple printing devices. Accordingly, the apparatus 10b may be used by a technician or an operator of printing devices to diagnose the printing device.

Figure 5:
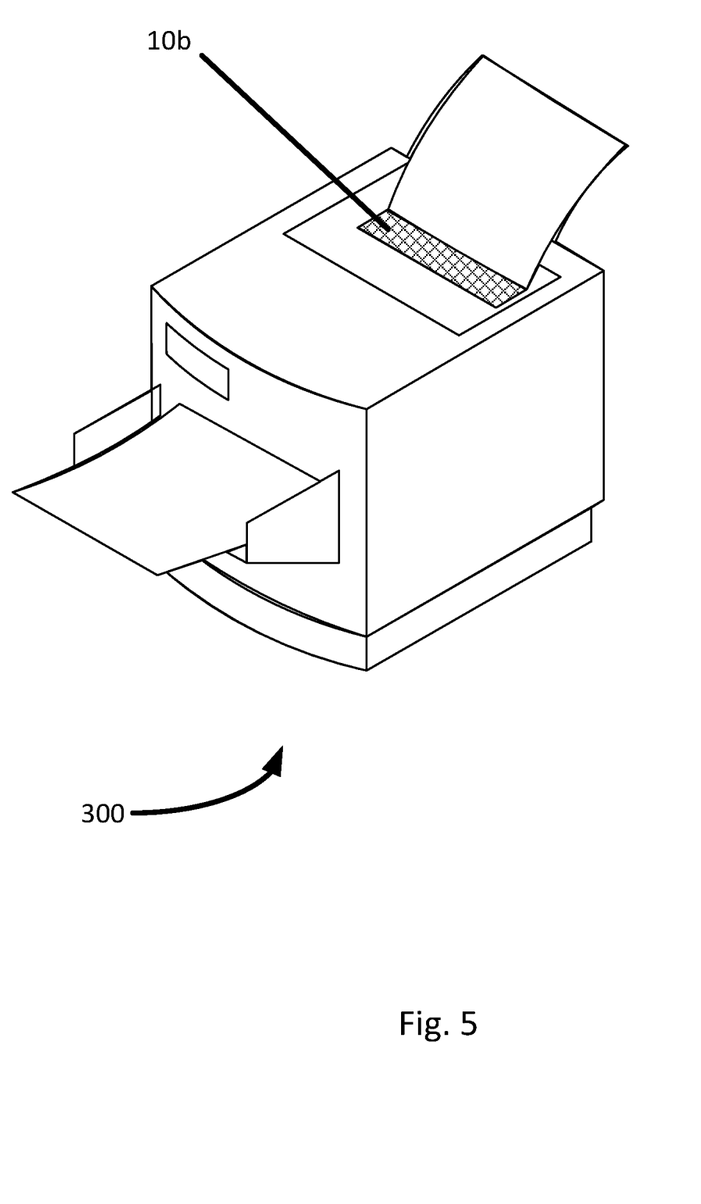
FIG. 5 is an example of a printing device with the apparatus of FIG. 4.

In other examples, the apparatus 10b may be installed on a printing device 300 as shown in FIG. 5. In this example, the apparatus 10b is installed as an inline scanner module configured to scan each document generated by the printing device 300. Furthermore, the apparatus 10b may be connected to a network to provide life expectancy data over the network to a central monitoring station. In such an example, the apparatus 10b maybe part of a smart printer where the parts of the printer are monitored such that remote diagnosis and solutions to issues, such as print quality issues may be address.

It should be recognized that features and aspects of the various examples provided above may be combined into further examples that also fall within the scope of the present disclosure.

What is claimed is:

1. An apparatus comprising:
   a communication interface to receive an image file, wherein the image file represents a scanned image of an output generated by a printing device, wherein the scanned image has arbitrary content;
   an identification engine to process the image file with a convolutional neural network model to identify a feature, wherein the feature may be indicative of a potential failure, wherein the convolutional neural network was trained with a plurality of training images to identify the feature; and
   an image analysis engine to indicate a life expectancy of a part associated with the potential failure based on the feature, wherein the image analysis engine uses the convolutional neural network model to determine life expectancy.

2. The apparatus of claim 1, further comprising a rendering engine.

3. The apparatus of claim 2, wherein the rendering engine is to generate a rendered image file.

4. The apparatus of claim 3, wherein the rendered image file is a passing sample to train the identification engine.

5. The apparatus of claim 4, wherein the identification engine is to identify the feature based on a difference between the image file and the rendered image file.

6. The apparatus of claim 1, further comprising a memory storage unit to store a training dataset, wherein the image analysis engine uses the training dataset to process the image file.

7. The apparatus of claim 1, further comprising a scanner module in communication with the communication interface, wherein the scanner module is to generate the image file.

8. A method comprising:
   receiving a scanned image of a document of arbitrary content, wherein the document includes a defect;
   identifying the defect with an identification engine, wherein the identification engine applies a convolutional neural network model to process the scanned image, wherein the convolutional neural network was trained with a plurality of training images to identify image features indicative of defects;
   analyzing the defect to determine a part associated with the defect; and
   determining a life expectancy of a part associated with the defect, wherein determining the life expectancy uses the convolutional neural network model.

9. The method of claim 8, further comprising generating a rendered image.

10. The method of claim 9, further comprising using the rendered image as a passing sample to train the identification engine.

11. The method of claim 10, further comprising scanning output from a printing device with a scanner module to generate the scanned image.

12. A non-transitory machine-readable storage medium encoded with instructions executable by a processor, the non-transitory machine-readable storage medium comprising:
   instructions to receive a scanned image of output generated by a printing device, wherein the scanned image has arbitrary content;
   instructions to identify a feature in the scanned image by application of a convolutional neural network model to process the scanned image, wherein the convolutional neural network was trained with a plurality of training images to identify the feature;
   instructions to analyze the feature to determine a part associated with the feature; and
   instructions to determine a life expectancy of a part of the printing device based on the feature, wherein determining the life expectancy uses the convolutional neural network model.

13. The non-transitory machine-readable storage medium of claim 12, further comprising instructions to generate a rendered image.

14. The non-transitory machine-readable storage medium of claim 13, further comprising instructions to apply the convolutional neural network model on the scanned image and the rendered image.

15. The non-transitory machine-readable storage medium of claim 14, further comprising instructions to scan output from a printing device with a scanner module to generate the scanned image.

* * * * *